3,313,711
PREPARATION OF AMINOPEPTIDASE
Pieter G. Celliers, Stellenbosch, Republic of South Africa, and Gerhard Pfleiderer, Frankfurt am Main, Germany; said Pfleiderer assignor to Rohm & Haas G.m.b.H., Darmstadt, Germany
No Drawing. Filed July 13, 1964, Ser. No. 382,354
Claims priority, application Germany, July 18, 1963, R 35,700
10 Claims. (Cl. 195—62)

This invention relates to methods for the preparation of aminopeptidase, and to the products prepared.

According to the present invention, it has been found that aminopeptidase can be obtained from animal organs in a simple manner and in outstanding yield. According to the present invention, animal organs such as mammalian kidneys, liver, brain, or heart are mechanically subdivided and dispersed in water or in an isotonic salt or sugar solution. The finely dispersed cell fraction is then isolated from this dispersion, again brought into an aqueous phase if necessary, and then treated with a water-immiscible lipoid-dissolving organic solvent inert to enzymes. The fraction separating at the boundary between the aqueous and organic solvent phases is collected and treated with a proteolytic enzyme. In this manner, the aminopeptidase is freed from an accompanying carrier substance and can be isolated according to conventional methods.

For example, in carrying out the process of the invention ground organs dispersed in water or in a salt or sugar solution are centrifuged, optionally after further homogenization, to separate the coarsely dispersed portions from the dissolved, colloidally divided, and finely dispersed materials (microsomes and other cell fractions) contained in the aqueous phase. For such a process, the centrifugal acceleration used is suitably from 10,000 to 40,000 times gravitational acceleration. In general, centrifugation for one hour at 10,000 g. to 40,000 g. will adequately separate the coarsely and finely dispersed fractions.

The major portion of the aminopeptidase to be isolated is found in the cloudy aqueous medium and is bound to a carrier substance whose chemical structure has not as yet been clearly determined. Nevertheless, it is certain that the carrier materials are substances with an albuminoid character, presumably lipoproteins, which can be hydrolytically cleaved by proteolytic enzymes.

A thorough and smooth hydrolysis of the carrier substance, which is in turn necessary for the isolation of the desired aminopeptidase, requires a structural change in the enzyme-binding carrier during the course of the hydrolysis. The nature of this change has not been completely explained. This structural alteration is brought about in the present invention by the aforementioned treatment with a lipoid-solvent, such as toluene or its equivalents. The use of these solvents can proceed by several different methods.

For example, the aqueous phase obtained after separation and removal of the coarsely dispersed fibrous portions from a dispersion of animal organs can be recentrifuged, suitably with a centrifugal acceleration of from 50,000 g. to 100,000 g. The sediment obtained in this manner contains cell fractions including the enzyme-containing microsomes. The sediment is then dispersed in a buffer solution and treated with a lipoid-solvent such as toluene, optionally after a previous washing. Separation of the aqueous and organic phases can be accelerated by a short centrifugation, if desired. Between the solvent phase and the aqueous phase, a lipoprotein-containing intermediate layer is formed, in which layer the enzymatic activity is principally to be found. This intermediate layer is isolated, is suitably diluted with an aqueous buffer solution, and is contacted with a proteolytic enzyme, for example with an aqueous solution of tryspin, pancreatin, or mold fungus or bacterial proteases. Apparently, the carrier substance is so completely altered by the previous solvent treatment that it is quickly decomposed, while the native ferment resists damage by the albumin cleaving enzyme.

Another method for isolating the aminopeptidase containing carriers and enzymatically decomposing them is as follows. The aqueous residue remaining after separation of the coarsely-dispersed organ fragments is poured over a floatation-filter layer, for example of kieselguhr or of one of the chemically modified dextran gels such as those commercially available under the trade name "Sephadex." The finely dispersed fractions, among which are the peptidase-containing carrier substances which are to be isolated, are retained by such a filter. After dispersion of the loaded filter in an aqueous buffer solution, a lipoid-dissolving solvent is added. Again, the formation of three layers already described occurs. The middle layer is treated as described earlier herein.

It is possible, and is of particular advantage, to treat the aqueous solution remaining after separation of the coarsely dispersed parts directly with solvent by shaking the two together, whereby the structural alteration in the enzyme-containing carrier substance necessary for the recovery of aminopeptidases according to the invention occurs, and the formation of three layers takes place.

As the water-immiscible lipoid-dissolving organic solvents which can be used in the invention, which solvents are not detrimental to enzymes, aliphatic and aromatic liquid hydrocarbons such as xylene, petroleum ether, or benzene can be employed. Toluene is a preferred solvent. Ethers, such as diethyl ether, and water-insoluble alcohols can also be used but tend to give low yields. The structural alteration of the carrier substance which permits its subsequent attack by protease can be increased by the presence of fat-cleaving enzymes. However, even when it is possible to carry out the necessary structural alteration (which may be looked upon as a separation of structures) exclusively by fermentative processes, the use of an organic solvent of the type described has proved useful because of the formation of an intermediate layer in which the enzyme, bound to the carrier substance, is found. The separation of this intermediate layer effects a concentration of the active substance to be recovered which for the first time makes possible a great gain in the economy of the process.

After the above-described proteolytic decomposition of the carrier substance, an aqueous solution containing the peptidase to be recovered is obtained. If desired, the solution can be freed of clouding substances by techniques known in the art before it is worked up further.

The isolation of the enzyme from the resulting solution is suitably carried out chromatographically, as is known for the isolation of other enzymes. The chemically modified dextran gel already-mentioned can be employed with special advantage for this purpose and is known to operate both as a molecular sieve and as an ion exchanger which retains not only the aminopeptidase contained in the aqueous solution, but the added protease as well. By conventional washing with buffer solution, the aminopeptidases can be eluted, and then obtained in pure form by other techniques known to the enzyme chemist, for example by concentration in vacuum, or by freeze-drying, or by precipitation, optionally after a previous dialysis of the aqueous solution.

The buffer solutions employed in the present invention for dilution of aminopeptidase-containing fractions, for washing, or for elution of the product from chromatographic substrates suitably have a pH between about 7 and about 8.6.

The aminopeptidase produced by the method of the invention is an electrophoretically uniform ferment from which companion enzymes such as carboxypeptidase and prolinase are eliminated by the preparatory methods taught earlier herein.

Davis and Smith in the Journal of Physiological Chemistry, 224 (1957), 261–275, teach a process for the preparation of highly pure leucinaminopeptidase on a laboratory scale. This substance is unlike the aminopeptidase of the present invention in several respects. For instance, it is highly sensitive to heat, is reversibly inactivated by EDTA, and requires $Mg^{++}$ or $Mn^{++}$ ions for activation. In contrast, the aminopeptidase of the invention has a much greater tolerance to heat, is unaffected by EDTA, and requires no ions to be effective. Also, leucinaminopeptidase and the product of the invention show different activity toward alanine-p-nitranilide, glycylpeptides such as gly-gly or gly-leu or gly-gly-gly, leucine - p - n - nitranilide, and leucinamide. The aminopeptidase of the invention cleaves alanine - p - nitranalide and the glycylpeptides well, leucine - p - nitranalide less well, and leucinamide hardly at all. Conversely, leucinaminopeptidase hydrolyzes the last mentioned materials easily, while scarcely affecting glycylpeptides and alanine-p-nitranilide.

Like leucinaminopeptidase, the aminopeptidase of the present invention is useful for the systematic cleavage of peptides and proteins for synthetic and analytic purposes, particularly for assuring the optical uniformity of synthetic peptides (cf. "The Enzymes," Boyer et al., 2d edition, 1960, vol. 4, p. 37 et seq., particularly page 60). Whereas leucinaminopeptidase cleaves peptide bonds at the N-terminal amino acid, whereby a strong specificity for the exclusive cleavage of levorotatory amino acids arises, the aminopeptidase of the invention has the advantage of being less specific and is capable of cleaving a wider variety of peptide bonds, as indicated above.

By combining the aminopeptidase of the invention with proteases, a total enzymatic hydrolysis of proteins can be effected (cf. G. Pfleiderer et al., Biochem. Zeitschrift, 339 (1963, 186–189).

A better understanding of the invention and of its many advantages will be had by referring to the following specific examples given by way of illustration.

*Example 1*

1 kg. of frozen swine kidneys were ground in a mechanical meat grinder, combined with 2 liters of Zamecznik buffer [Zamecznik and Keller, J. Biol. Chem., 209, 337 (1954)] having a pH of 8.1, and then homogenized at room temperature in a mechanical blender. Subsequently, the mixture was centrifuged for sixty minutes at 20,000 g.

3,100 milliliters of the centrifugate were stirred for two hours with 1,550 milliliters of toluene at room temperature and then centrifuged over a period of 45 minutes at 20,000 g. After separation of the toluene and the lower aqueous phase, the layer of solids between the phases was isolated and homogenized for two minutes in a mechanical blender with 1,400 milliliters of 0.01 M Tris/HCl buffer (pH of 8.1).

200 milligrams of multiply recrystallized trypsin comprising about 25 Anson units per gram were dissolved in the resulting homogenizate, which was then incubated for 45 minutes at room temperature (37° C.) and subsequently cooled to 0° C.

A "Sephadex A 50–DEAE" column was equilibrated with 0.01 M Tris buffer at a pH of 8.1 and, after introduction of the enzyme solution with 0.01 M Tris buffer at a pH of 8.1, was washed with 0.1 M NaCl. The aminopeptidase was eluted with 0.4 M NaCl, and the active fraction was reduced in volume, dialyzed, and freeze dried.

From 1 kg. of kidneys, 800 mg. of enzyme having an activity of 1,000 units per milligram of protein were obtained.

For determining aminopeptidase, the method according to Tuppy, Zeitschrift fur Physikalische Chemie, 329, 278 (1962) was employed. Namely, 1.8 ml. of 0.01 M Tris/HCl buffer (pH 8.1) in 0.01 M $MgCl_2$, 0.2 ml. of $1.66(10^{-2})$ M leucine-p-nitranilide solution, and 0.02 ml. of enzyme solution were pipetted into a cuvette at room temperature (37° C.). The time for an increase in the extinction coefficient ($\Delta E = 0.05$) in seconds is measured at 405 millimicrons. The activity of the enzyme solution is then defined as follows:

$$\text{Unit/ml.} = \frac{2.02 \times 50}{0.02 \times t}$$

*Example 2*

The process of Experiment 1 was repeated using calves kidneys, rather than swine kidneys, as the starting material.

500 milligrams of enzyme having an activity of 870 units per milligram of protein were obtained from 1 kg. of kidneys.

*Example 3*

Using the process of Example 1, calves liver was employed as the starting material in place of swine kidney.

From 1 kg. of calves liver, 360 mg. of enzyme having anactivity of 720 unit/mg. protein were obtained.

*Example 4*

The experiment of Example 1 was repeated employing petroleum ether as the solvent instead of toluene.

340 milligrams of enzyme having an activity of 680 units per milligram of protein were obtained from 1 kg. of kidneys.

*Example 5*

1 kg. of fresh swine kidneys were homogenized with 2 liters of Zamecznik buffer in a mechanical blender. The homogenizate was centrifuged for thirty minutes at 40,000 g. The remaining liquid was decanted and then recentrifuged for 90 minutes at 100,000 g. The sediment was suspended in 2 liters of 0.01 M Tris buffer (pH of 8.1) in 0.01 M $MgCl_2$. After one hour's stirring with 1 liter of toluene, the mixture was centrifuged at 40,000 g. for one hour. Phase separation into three layers occurred. The intermediate layer was treated with trypsin as in Example 1, and the enzyme liberated was chromatographically purified.

Although specific embodiments have been shown and described herein, it should be understood that they are illustrative and not limiting on the scope and spirit of the invention.

What is claimed is:
1. A process for the preparation of amino-peptidase from animal organs which comprises dispersing finely divided animal organs in an aqueous phase, centrifuging said aqueous phase at 10,000 g. to 40,000 g. to remove coarsely dispersed cell fractions therefrom, contacting the remaining finely-dispersed cell fractions, dispersed in an aqueous phase, with a water-immiscible, lipoid-dissolving, enzyme inert organic solvent selected from the group consisting of aliphatic and aromatic hydrocarbons, collecting the material separating at the phase boundary between said aqueous phase and said water-immiscible solvent, treating the collected material with a proteolytic enzyme whereby amino-peptidase is freed therefrom, and then recovering said aminopeptidase.

2. A process as in claim 1 wherein, after centrifuging said aqueous phase to remove said coarsely dispersed cell fractions, said finely dispersed cell fractions are isolated by filtering said aqueous phase through a flotation filter to retain said finely-dispersed cell fractions on said filter, and said finely dispersed cell fractions are then redispersed in an aqueous phase prior to contact with said organic solvent.

3. A process as in claim 1 wherein, after centrifuging said aqueous phase to remove said coarsely-dispersed cell fractions, said finely-dispersed cell fractions are isolated by further centrifuging said aqueous phase at 50,000 g. to 100,000 g., and said finely-dispersed cell fractions are then redispersed in an aqueous phase prior to contact with said organic solvent.

4. A process for the preparation of amino-peptidase from animal organs which comprises dispersing finely divided animal organs in an aqueous phase, centrifuging said aqueous phase at 10,000 g. to 40,000 g. to remove coarsely dispersed cell fractions therefrom, contacting the remaining finely-dispersed cell fractions, dispersed in an aqueous phase, with toluene, collecting the material separating at the phase boundary between said aqueous phase and said toluene, treating the collected material with trypsin whereby aminopeptidase is freed therefrom, and then recovering said aminopeptidase chromatographically.

5. Aminopeptidase prepared by the process of claim 1, said aminopeptidase being unaffected by EDTA, being biologically effective in the absence of activating ions, easily cleaving glyclypeptides, and having little effect on leucinamide.

6. A process as in claim 1 wherein, after centrifuging said aqueous phase to remove said coarsely dispersed cell fractions, said aqueous phase containing said finely dispersed cell fraction is contacted directly with said water-immiscible solvent.

7. A process as in claim 1 wherein said water-immiscible, lipoid-dissolving, enzyme inert organic solvent is toluene.

8. A process as in claim 1 wherein said proteolytic enzyme is selected from the group consisting of trypsin, pancreatin, and mold fungus and bacterial proteases.

9. A process as in claim 1 wherein said proteolytic enzyme is tryspin.

10. A process as in claim 1 wherein said aminopeptidase is recovered chromatographically.

References Cited by the Examiner

Binkley, F. S.: Journal American Chemical Society 82, 987–990, Feb. 20, 1960.

Matheson, A. T., et al.: Canadian Journal of Biochemistry and Physiology, vol. 41, pages 1741 to 1770, August 1963.

A. LOUIS MONACELL, *Primary Examiner.*

L. M. SHAPIRO, *Assistant Examiner.*

UNITED STATES PATENT OFFICE

CERTIFICATE OF CORRECTION

Patent No. 3,313,711                                April 11, 1967

Pieter G. Celliers et al.

It is hereby certified that error appears in the above numbered patent requiring correction and that the said Letters Patent should read as corrected below.

In the heading to the printed specification, line 5, for "said Pfleiderer assignor to" read -- assignors to --.

Signed and sealed this 14th day of November 1967.

(SEAL)
Attest:

Edward M. Fletcher, Jr.
Attesting Officer

EDWARD J. BRENNER
Commissioner of Patents